US006373617B1

(12) United States Patent
Boffi et al.

(10) Patent No.: US 6,373,617 B1
(45) Date of Patent: Apr. 16, 2002

(54) OPTICAL SYSTEM HAVING OPTICAL CONTROL BEAM

(75) Inventors: Pierpaolo Boffi, Voghera; Davide Piccinin, Milan; Andrea Tonini, Bergamo; Mario Martinelli, San Donato Milanese, all of (IT)

(73) Assignee: Optical Technologies Italia SpA, Milan (IT)

( * ) Notice: Subject to any disclaimer, the term of this patent is extended or adjusted under 35 U.S.C. 154(b) by 0 days.

(21) Appl. No.: 09/465,798

(22) Filed: Dec. 17, 1999

Related U.S. Application Data
(60) Provisional application No. 60/114,891, filed on Jan. 5, 1999.

(30) Foreign Application Priority Data

Dec. 18, 1998 (EP) .............................. 98830767

(51) Int. Cl.[7] ................................ G02F 1/03
(52) U.S. Cl. ................ 359/245; 359/245; 359/246; 359/250; 359/251
(58) Field of Search ................. 359/246, 251, 359/257, 258, 322, 255, 256, 583, 484, 250, 247, 259; 385/8, 9, 20, 21, 22

(56) References Cited

U.S. PATENT DOCUMENTS 5,305,136 A    4/1994  Smith ..................... 359/247
5,724,165 A  * 3/1998  Wu ........................ 359/117

OTHER PUBLICATIONS

Liu et al.; "Logic Gate Modules Using Opto–Optical Birefringence Switching", Optics Letters, vol. 16, No. 18, pp. 1439–1441, Sep. 15, 1991.

Pietralunga et al.; "CdTe: In Monocrystal Modules For All–Optical Processing", Journal of Nonlinear Optical Physics & Materials, vol. 5, No. 2, pp. 247–268, Jan. 1, 1996.

* cited by examiner

Primary Examiner—Georgia Epps
Assistant Examiner—Tuyen Tra
(74) Attorney, Agent, or Firm—Needle & Rosenberg, P.C.

(57) ABSTRACT

An optical device having a first input for at least one input optical signal having a random state of polarization and a first optical element capable of dividing, in space, the input optical signal into a pair of optical signals which are substantially parallel and have a predetermined state of polarization perpendicular to each another. The optical device also having a first crystal element for propagation, in free space, of at least the pair of optical signals coming from the first optical element, and the first crystal element being devoid of internal separation planes, and having electro-optical properties and being associated with electrodes so as to apply a voltage in a direction substantially perpendicular to the direction of propagation, along the first crystal element, of the at least one pair of optical signals. The optical device also having an optical control element for supplying at least one optical control beam, having a predetermined power, to the first crystal element, the at least one optical control beam being superimposed on the at least one pair of optical signals and having a direction of propagation which along the first crystal element is substantially perpendicular to the direction of application of the voltage, the at least one optical control beam being capable of causing to rotate through a predetermined angle the state of polarization of the at least one pair of optical signals in the first crystal element. The optical device also having a second optical element capable of combining the at least one pair of optical signals coming from the first crystal element in a single output signal and a first output for the output signal.

10 Claims, 8 Drawing Sheets

OPTICAL SYSTEM HAVING OPTICAL CONTROL BEAM

RELATED APPLICATION

This application is based on European Patent Application No. 98830767.4 filed on Dec. 18, 1998 and U.S. Provisional Application No. 60/114,891 filed on Jan. 5, 1999, the content of which is incorporated hereinto by reference.

BACKGROUND OF THE INVENTION

The present invention relates to a device able to process an optical signal. More particularly the present invention relates to a device able to process an optical signal by means of an optical control system and in a manner independent of the state of polarization of this optical signal.

Following the widespread development of optical-fibre transmission systems, there is an urgent need for devices which are able to perform, at high speed, different operations on the bits which constitute the digital information of an optical signal.

The present apparatus used for the processing of optical signals are inadequate for managing the increasingly higher transmission rates which are possible in optical-fibre transmission systems. In fact, these apparatus consist of digital electronic devices which are based typically on serial processing of the information or optical devices which, however, are controlled by electrical signals. All these devices have a limited band compared to the optical band available in optical-fibre transmission systems.

Moreover, the optical signals coming from an optical transmission line have a random, and therefore unpredictable, state of polarization. In fact, during their propagation along an optical transmission means, they are subject to a random disturbance of their state of polarization (SOP). More particularly, in an optical fibre, typically a single-mode optical fibre, the SOP of an optical signal is disturbed both on account of manufacturing defects (such as, for example, a not perfectly circular geometry of the core and/or lack of homogeneity of the material) and on account of the action of external agents (such as variations in the external temperature, displacements of the fibre, vibrations and stress). These disturbances are random and unpredictable. Even a relatively short fibre (for example with a length of one metre), if subjected to stress or to variations in temperature, may disturb significantly and in a random manner the SOP of the optical signal which is propagated there.

SUMMARY OF THE INVENTION

The inventors of the present invention have therefore considered the problem of fully exploiting the optical band available in optical-fibre transmission systems using an optical device which is able to process an optical signal in optical form by means of an optical control system and in a manner independent of its state of polarization. More particularly the inventors have considered the problem of fully exploiting the optical band available in optical-fibre transmission systems using an optical device comprising a crystal element possessing properties which are electro-optical (i.e. it becomes birefringent when subject to the action of an applied electric field and its refraction indices vary with a variation in intensity in said electric field) and photoconductive (its refraction indices, assuming a constant applied electric field, may be further varied by the action of the light which photo-generates charge carriers which screen the action of the applied electric field).

According to its first aspect, the present invention therefore relates to an optical device comprising:

a) a first input for at least one first input optical signal having a random state of polarization;

b) a first optical element capable of dividing, in space, said at least one input optical signal into a pair of optical signals which are substantially parallel and have a predetermined state of polarization perpendicular to one another;

c) a first crystal element for propagation, in free space, of at least said pair of optical signals coming from said first optical element, said first crystal element being devoid of internal separation planes, having electro-optical properties and being associated with electrodes so as to apply a voltage in a direction substantially perpendicular to the direction of propagation, along said first crystal element, of said at least one pair of optical signals;

d) an optical control element for supplying at least one optical control beam, having a predetermined power, to said first crystal element, said at least one optical control beam being superimposed on said at least one pair of optical signals and having a direction of propagation which along said first crystal element is substantially perpendicular to said direction of application of said voltage, said at least one optical control beam being capable of causing to rotate through a predetermined angle the state of polarization of said at least one pair of optical signals in said first crystal element;

e) a second optical element capable of combining said at least one pair of optical signals coming from said first crystal element in a single output optical signal;

f) a first output for said output optical signal.

During the course of the present description and the claims:

the expression "optical control beam superimposed on an optical signal" is used to indicate an optical control beam which is superimposed on said optical signal in the whole region crossed by it in a crystal element devoid of internal separation planes;

the expression "optical control beam collinear with an optical signal" is used to indicate an optical control beam which is propagated in the same direction in which this optical signal is propagated;

the expression "a crystal element devoid of internal separation planes" is used to distinguish a single crystal from elements obtained from the combination of two or more crystals;

the expression "propagation in free space" is used to indicate all the modes of propagation of an optical signal not guided by a suitable waveguide such as, for example, an optical fibre.

Preferably, said optical control beam is also substantially collinear with said at least one pair of substantially parallel optical signals.

Typically, said at least one pair of optical signals lies in a plane parallel to one face of said first crystal element.

Advantageously, said input consists of an optical fibre.

Typically, said first optical element comprises a right-angled reflecting prism and a polarization separator.

Similarly, said output also advantageously consists of an optical fibre. Moreover, said second optical element typically also comprises a right-angled reflecting prism and a polarization separator.

According to a first embodiment, said optical device also comprises a second output and said second optical element also comprises a second right-angled reflecting prism.

According to a second embodiment, the optical device according to said first embodiment also comprises a second input for at least one second optical signal having a random state of polarization and said first optical element also comprises a second right-angled reflecting prism.

Said first and second optical signals, which have a random state of polarization, may each be superimposed on a respective optical control beam and be propagated in two different regions of said first crystal element or, alternatively, may be associated with the said optical control beam superimposed on both of them. In this latter case, said first and second optical signals are propagated preferably in the same region of said first crystal element.

A typical example of an optical element comprising two right-angled reflecting prisms and a polarization separator is described in the patent U.S. Pat. No. 5,305,136 included herein by way of reference.

According to a variant, said first and said second optical elements may each consist of a calcite prism, for example, a calcite prism manufactured by BERNHARD HALLE with a polarization insensitivity of about −40 dB.

Advantageously, a suitable optical collimator is associated with each of said inputs and said outputs. Preferably, said optical collimator consists of a "grin" type lens.

Preferably, said first crystal element consists of a single crystal of cadmium telluride doped with indium (CdTe:In).

A typical example of said first crystal element is described in the European patent application No. 97201874.1, filed in the name of the same Applicant, which is included herein by way of reference.

Preferably, said voltage applied to the electrodes of said first crystal element is selected so as to rotate through an angle of about 90° the state of polarization of said at least one pair of substantially parallel optical signals.

Moreover, the power of said optical control beam is preferably selected so as to cancel out the effect of said voltage, causing said at least one pair of substantially parallel optical signals to return to their initial state of polarization.

Typically, said optical control element comprises an optical source and a collimation element. According to one embodiment, said optical control element also comprises a first and a second dichroic mirror. Preferably said first dichroic mirror is arranged upstream of said first crystal element and said second dichroic mirror downstream thereof. Moreover, preferably said dichroic mirrors are transparent to the wavelength of said at least one pair of optical signals and therefore reflect the wavelength of said optical control beam.

Preferably, the wavelength of said optical signal with a random state of polarization is between 1000 and 1650 nm and, more preferably, between 1300 and 1600 nm.

Advantageously, said dichroic mirrors are substantially inclined at 45° with respect to the direction of propagation of said at least one pair of optical signals and said optical control beam. Moreover, said optical control beam has a direction substantially perpendicular to the direction of propagation of said at least one pair of optical signals both upstream of said first crystal element, prior to striking said first dichroic mirror, and downstream of said first crystal element, after being reflected by said second dichroic mirror.

Preferably, said element for collimation of said optical control element is capable of directing in free space said optical control beam so that it strikes said first dichroic mirror at about 45° and so that, after being reflected by it, it is substantially collinear with and superimposed on said at least one pair of optical signals.

Even faster response times may be obtained when the optical device according to the invention also comprises a second crystal element positioned between said first crystal element and said second optical element and when said optical control element also supplies a second optical control beam to said second crystal element.

As regards the structural and functional characteristics of said second crystal element, reference is made to that already stated above in connection with said first crystal element.

According to a third embodiment, in the optical device according to the invention:

first optical elements are capable of dividing two first optical signals, which have a random state of polarization, into two respective first pairs of substantially parallel optical signals, which have a predetermined state of polarization perpendicular to one another, and of causing propagation of said first pairs of optical signals in a first region of said first crystal element, and second optical elements are capable of dividing two second optical signals, which have a random state of polarization, into two respective second pairs of substantially parallel optical signals which have a predetermined state of polarization perpendicular to one another, and of causing propagation of said second pairs of optical signals in a second region of said first crystal element.

Preferably, the optical control element also supplies a second optical control beam which illuminates said second region of said first crystal element, while said first optical control beam illuminates said first region of said first crystal element. Moreover, said second region is different from said first region.

Typically, said first elements and said second elements comprise, in addition to the first and second optical element also a third and a fourth optical element and four optical circulators each with three ports.

Advantageously, each optical circulator has a port associated with one of the two inputs or with one of the two outputs of the optical device according to the invention and two ports associated with a respective optical collimator so as to cause propagation of said first pairs of optical signals in said first region of said first crystal element and said second pairs of optical signals in said second region of said first crystal element.

As regards the structural and functional characteristics of said third and fourth optical elements, said collimators and said second optical control beam, reference is made to that described further above.

In addition to the advantage of being insensitive to the state of polarization of the input optical signals and of being optically controlled, the optical device according to the invention has the advantage of processing at the same time several optical signals which are polarized by means of one or more optical control beams in a single crystal element devoid of internal separation planes.

This has the advantage of allowing the manufacture of a device which is much more compact and has a simpler architecture compared to the use of as many single crystals as there are polarized optical signals to be processed, each provided with independent electrodes.

Moreover, the device according to the present invention ensures uniformity of performance for each signal, avoiding having to select several crystals with characteristics which are identical to one another.

Furthermore, since the device according to the invention allows the processing of optical signals in a wide range of wavelengths (1000–1700 nm), it is suitable for use in a wavelength multiplexing telecommunications system (Wavelength Division Multiplexing, WDM).

For example, in a preferred embodiment which uses a CdTe:In single crystal, the optical device according to the present invention allows the processing of optical signals with a wavelength greater than 1200 nm and, therefore, also with wavelengths typical of optical-fibre transmission systems in a second and third window (approx. 1300–1550 nm).

Furthermore, the device according to the invention is characterized by a response time which is much faster than that of a similar electrically controlled device. For example, the device according to the invention has a response time of the order of microseconds and, in a preferred embodiment, of the order of nanoseconds, while the typical response times of an electrically controlled device are of the order of milliseconds.

Finally, another characteristic feature of the device according to the invention is that, owing to the symmetrical structure of the paths followed by the two optical signals polarized in mutually perpendicular states of polarization, at the output from the crystal element, when they are recombined by the optical element, the two optical signals are not delayed temporally with respect to one another.

BRIEF DESCRIPTION OF THE DRAWING

Characteristic features and advantages of the invention will now be illustrated with reference to embodiments shown by way of a non-limiting example in the accompanying drawings in which:

FIG. 1 shows a schematic view of a first mono-directional embodiment of an optical device according to the invention with one input and two outputs (1×2) in its crossed state (FIG. 1A) and in its barred state (FIG. 1B);

FIG. 3 shows the device according to FIG. 2 in its two states, i.e. crossed state (FIG. 3A) and barred state (FIG. 3B) with two optical signals entering the fibre 210 and, respectively, the fibre 240;

DETAILED DESCRIPTION

According to a first embodiment shown in FIG. 1, the device 1000 according to the invention comprises an input optical fibre 210; a first collimator 202; a first optical element 2001 capable of dividing, in space, an optical signal 100, coming from said optical fibre 210, into two substantially parallel optical signals polarized in two states of polarization p and s perpendicular to one another; a crystal element 200; a second optical element 2002 capable of combining said two substantially parallel optical signals in a single output optical signal 100; a second and a third collimator 214, 215; and a first and a second output optical fibre 220, 230.

In turn, said first optical element 2001 comprises a first polarization separator 203 and a right-angled reflecting prism 204 and said second optical element 2002 comprises a second polarization separator 208 and two right-angled reflecting prisms 209, 211.

Moreover, the device 1000 according to the invention also comprises an optical control element for supplying an optical control beam 330 to said crystal element 200. In turn, said optical control element comprises an optical source (not shown) for generating said optical control beam 330, a collimation element (not shown) for directing in free space said optical control beam 330 and a first and a second dichroic mirror 206, 207.

The collimator 202 acts as an interface between a first guided propagation section consisting of said input optical fibre 210 and a section in free space in which the first and the second optical elements 2001 and 2002, the crystal element 200 and the dichroic mirrors 206, 207 are present. In turn, the collimators 214 and 215 act as an interface between said section in free space and a second guided propagation section consisting of said two output optical fibres 220, 230.

The collimators 202, 214 and 215 preferably consist of conventional "grin" type lenses (with a pitch, for example, of 0.25) which, compared to conventional optical lenses, reduce the overall dimensions of the optical device 1000.

The polarization separators 203, 208 consist, for example, of cubic polarization dividers manufactured by BERNHARD HALLE or of polarization dividers integrated, for example, on a lithium niobate substrate.

The polarization separators 203, 206 consist, for example, of cubic polarization dividers manufactured by BERNHARD HALLE or of polarization dividers integrated, for example, on a lithium niobate substrate.

The polarization separator 203 divides spatially said optical signal 100, coming from said input fibre 210 and having a random state of polarization, into two optical signals polarized so as to assume two predetermined states of polarization p and s perpendicular to one another. The optical signal polarized into the state of polarization p (referred to below as "polarized optical signal p") leaves said polarization separator 203 in the same direction of incidence as the optical signal 100, while the optical signal polarized in the state of polarization s (referred to below as "polarized optical signal s") leaves said polarization separator 203 deviated through about 90° with respect to said direction of incidence of the optical signal 100.

Figure 1A:
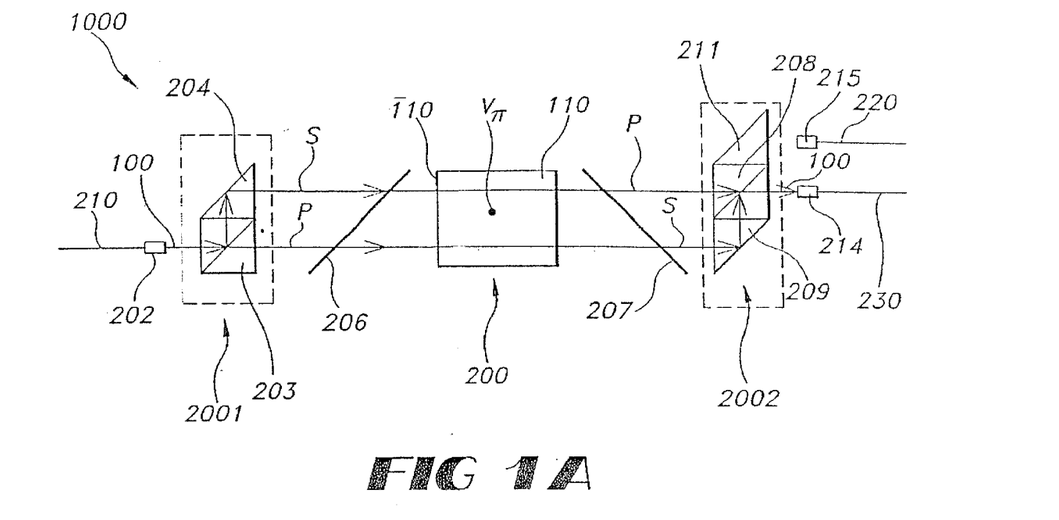
Figure 1B:
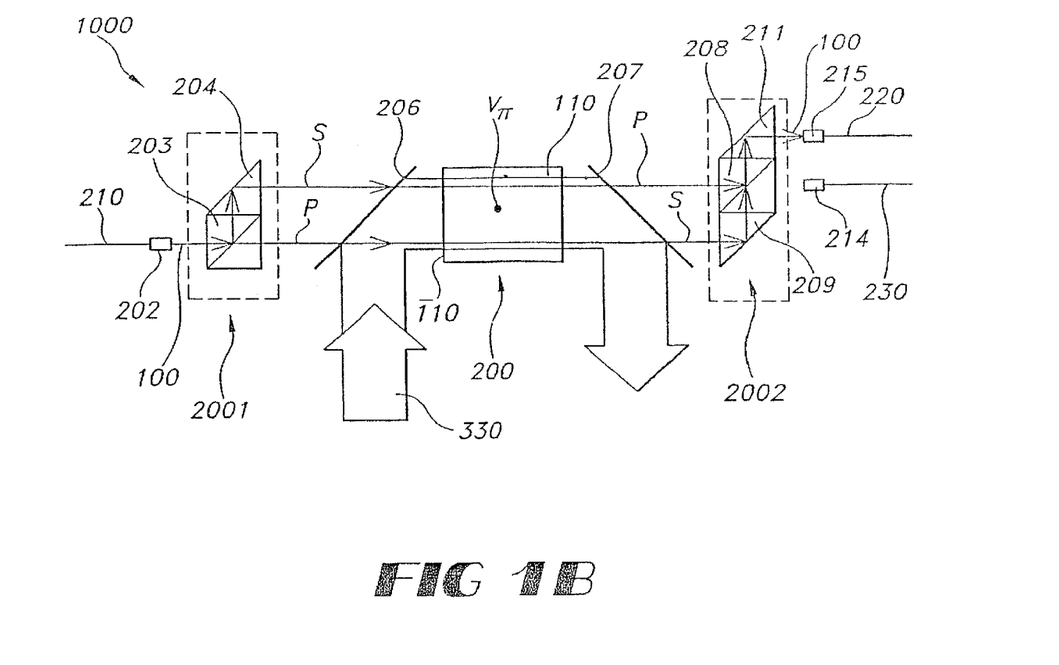

The optical signal polarized in the state of polarization s is thus transmitted to said right-angled reflecting prism 204 which in turn deviates it through a further 90° so that said optical signal polarized in the state of polarization s is propagated in free space separated spatially from said optical signal polarized in the state of polarization p, in a direction parallel thereto and in the same plane as it (in FIGS. 1A and 1B coinciding with the horizontal plane of the sheet).

The dichroic mirrors 206 and 207 are such that they transmit the wavelength of the two polarized optical signals p and s and reflect the wavelength of said optical control beam 330.

As shown in FIG. 1A, said two polarized optical signals p and s are thus propagated through the dichroic mirror 206, the crystal element 200 and the dichroic mirror 207 until they reach the second element 2002.

The crystal element 200 possesses electro-optical and photo-conductive properties.

Typically, the crystal element 200 is a cubic single crystal chosen from single crystals with electro-optical and photo-conductive properties belonging to the classes 43m, 42m and 23, such as, for example, $Bi_{12}SiC_{20}$, InP, BGO (germanium-bismuth oxide), CdTe, GaAs and $LiNbO_3$.

A typical example of said crystal element 200 consists of a single crystal of cadmium telluride doped with indium (CdTe:In).

Said single crystal 200 with dimensions, for example, of about 5×5×15 mm is located in a Plexiglas mounting which has openings on the faces for entry and exit of the two polarized optical signals p and s and, internally, is provided with electrodes to which a voltage Vπ is applied.

This voltage Vπ is applied in a direction perpendicular to the direction of propagation of the two polarized optical signals p and s and is selected so that the axes of birefringence induced by it in said single crystal 200 are oriented at 45° with respect to the two states of polarization p and s and so that they are thus rotated through 90° as a result of the electro-optical effect. In this way, upon leaving said single crystal 200, the optical signal which, at the input, was polarized in the state of polarization p, is polarized in the state of polarization s, and the optical signal which was polarized in the state of polarization s is polarized in the state of polarization p (cross state).

Figure 5A:
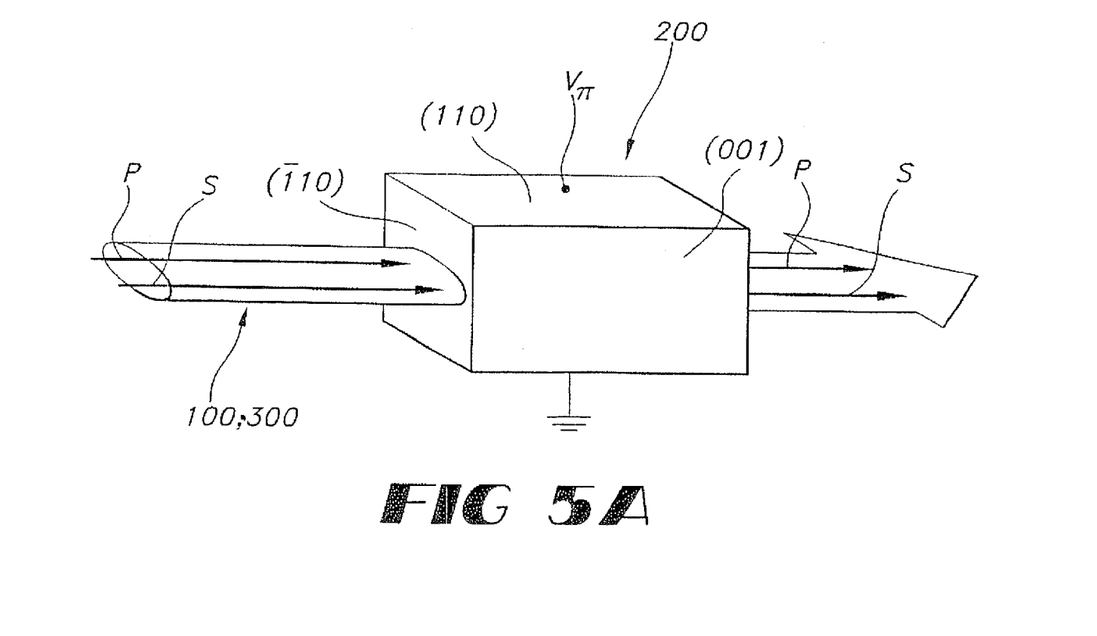
FIG. 5 shows a schematic illustration of a crystal element of the device according to the invention and the directions of the pair of polarized optical signals, the voltage and the optical control beam with respect to the faces of said crystal element.

In this embodiment, the voltage Vπ is applied perpendicularly with respect to the face 110 of said single crystal 200, while the direction of propagation of the two polarized optical signals p and s of the optical control beam 330 is perpendicular to the face 110 (FIG. 5A).

The optical control beam 330, when it strikes a zone of said single crystal 200 to which said voltage (and, therefore, a constant electric field) is applied, excites charge carriers in the impurity level conduction band. These photo-generated charge carriers migrate, owing to the action of said applied electric field, into the adjacent dark region (not illuminated by the optical beam) where they are trapped.

The optical control beam 330, when it strikes a zone of said single crystal 220 to which said voltage (and, therefore, a constant electric field) is applied, excites charge carriers in the impurity level conduction band. These photo-generated charge carriers migrate, owing to the action of said applied electric field, into the adjacent dark region (not illuminated by the optical beam) where they are trapped.

The resultant spatial charge density associated with the trapped charge carriers thus creates an electric field opposite to that which is applied and, at suitable intensities of said optical control beam 330, the electric field generated balances, in the illuminated zone, the applied electric field. The effect thus created in the illuminated zone is referred to as a "screening effect".

Therefore, when a zone of said single crystal 200 is illuminated by said optical control beam 330 of predetermined intensity, the screening effect produced by the photo-generated charge carriers inhibits, in said zone illuminated by said optical control beam 330, the electro-optical effect produced by said applied voltage. Consequently the states of polarization p and s of said two polarized optical signals which are propagated in the illuminated region of said single crystal 200 are no longer rotated and said two polarized optical signals leave said single crystal 200 in the same state of polarization as when they entered it (bar state). Typically the wavelength of the input optical signal 100 is between 1000 and 1700 nm, and preferably between the wavelengths used for optical communications in the second and third window (1300 and 1550 nm).

Typically the wavelength of the optical control beam 330 which must induce a photo-conductive effect in the electro-optical crystal also lies in the range of 980–1700 nm.

For example, when said crystal element 200 consists of a single crystal of CdTe:In, the wavelength of the input optical signal 100 is preferably greater than 1200 nm (for example is equal to 1550 nm) and that of the optical control beam 330 is preferably equal to about 980 nm and, more preferably, to about 1064 nm. In fact, the single crystal of CdTe:In is substantially transparent to wavelengths greater than 1200 nm and has a photo-conductivity peak of about 1064 nm.

In this case, the dichroic mirrors 206 and 207 are transparent to the wavelength of 1550 nm and reflect the wavelength of 1064 nm.

For example, when the optical control beam 330 has a wavelength of 1064 nm, it is generated by a laser source (not shown) in Nd:YAG with an output power of a few milliwatts, whereas, when it has a wavelength of 980 nm, it is generated by a conventional laser diode.

Since these sources generate a continuous optical signal, where required by the application of the device, the optical control beam 330 leaving them is suitably modulated (for example with a square wave or a train of pulses) by means of conventional modulators.

The output power of said optical control beam 330 is selected so as to inhibit, as already described above, the electro-optical effect induced by the voltage Vπ applied to the electrodes of the single crystal 200.

As shown in FIG. 1, the dichroic mirrors 206 and 207 are inclined at 45° with respect to the direction of propagation of the two polarized optical signals p and s and the optical control beam 330. Moreover, the latter arrives from a direction which is substantially perpendicular to that of the two polarized optical signals p and s and, after reflection on the dichroic mirror 206, is propagated along the single crystal 200 in a manner substantially collinear with and superimposed thereon. Then, upon leaving said single crystal 200, it is reflected by the dichroic mirror 207 so as to be separated again spatially from said two polarized optical signals p and s.

In this connection it is worth noting that, for the purposes of operation of the embodiment of the device 1000 according to FIG. 1 and the embodiments which will be described below, the direction of propagation of the optical control beam 330 may be reversed with respect to that shown in the Figure (for example, the optical control beam 330 may be reflected firstly on the dichroic mirror 207 and then on the dichroic mirror 206).

Figure 5B:
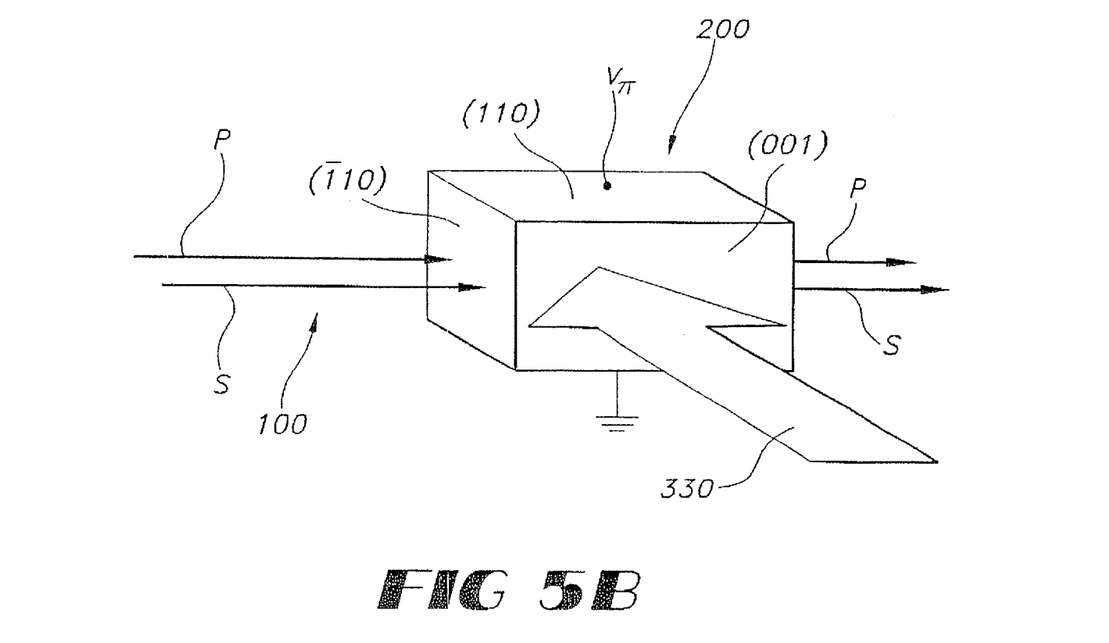

Moreover, said optical control beam 330 may also have a direction perpendicular to the face 001 of the single crystal 200 so as to be superimposed on said two polarized optical signals p and s and perpendicular to the direction of application of said voltage Vπ (FIG. 5B).

The first embodiment of the device 1000, shown in FIGS. 1A and 1B, may be used, for example, as a device for 1×2 directing of an optical signal, which has a random state of polarization, from an input optical fibre onto one of the two output optical fibres 220, 230.

The operation of this embodiment as a 1×2 directing device is described hereinbelow.

With reference to FIG. 1A, the optical signal 100 coming from said input fibre 210 is collimated by the collimator 202 and transmitted to the polarization separator 203 which divides said optical signal 100 in two optical signals polarized in two mutually perpendicular states of polarization p and s and separates them spatially by 90°. The polarized optical signal s is then reflected by the right-angled reflecting prism 204 such that said two polarized optical signals p and s enter parallel into the single crystal 200.

The voltage Vπ applied to the single crystal 200 rotates through 90° the state of polarization of the two polarized optical signals p and s. In this way, upon leaving the single crystal 200, the right-angled reflecting prism 209 deviates through 90° the direction of the polarized optical signal s, the polarization separator 208 combines the two polarized optical signals p and s in an output optical signal 100 having the same direction as the polarized optical signal p and the collimator 214 collimates said output optical signal 100 on the output fibre 230.

The input optical signal 100, which has a random state of polarization, is thus directed by the input fibre 210 to the output fibre 230 (cross operating state).

In turn, with reference to FIG. 1B, the optical control beam 330 illuminates the single crystal 200 so as to be collinear with and superimposed on the two polarized optical signals p and s.

In this way, the two polarized optical signals p and s are propagated in the crystal 200 without undergoing any rotation of their state of polarization.

The direction of the polarized optical signal p is thus deviated through 90° by the right-angled reflecting prism 209; the two polarized optical signals p and s are combined by the polarization separator 208 which supplies the output optical signal 100 which has the same direction as the polarized optical signal p striking it; the right-angled reflecting prism 211 deviates through 90° the direction of this optical signal 100 emitted by said polarization separator 208 and, finally, said optical signal 100 is focussed by the collimator 215 onto the output fibre 220 (bar operating mode).

After passing through the crystal 200, the optical control beam 330 is reflected by the dichroic mirror 207 which separates it spatially from the polarized optical signals p and s, thus preventing it from superimposing the latter upon leaving the device 1000.

When the optical control beam 330 is turned off, the 1×2 directing device 1000 returns into its cross state.

This embodiment of the device 1000 according to the invention may also be used, for example, as a 1×1 switch. In this case only one input fibre and one output fibre are used. For example, when the fibres 202 and 230 are used, the switch will be open (signal emitted by the fibre 230) in the crossed operating state and closed (no signal emitted by the fibre 230) in the barred operating mode.

Another type of 1×1 switch may be provided by means of a variation (not shown) of the embodiment shown in FIG. 1 of the device according to the invention. This variation has the same structural and functional characteristics as the embodiment according to FIG. 1 except for the fact that it comprises a single output fibre (for example the optical fibre 230) and, associated with the input of the second output element 2002, also comprises two polarization analysers capable of inhibiting the propagation of a polarized optical signal p and allowing a polarized optical signal s to pass, or vice versa. Typically said polarization analysers consist of conventional polarizing dividing cubes.

For example, in the case where the 1×1 switch has the output fibre 230, it will comprise, at the input of the polarization separator 208, a first polarization analyser capable of preventing the propagation of a polarized optical signal s and allowing a polarized optical signal p to pass, whereas it will comprise, at the input of the reflecting prism 209, a second polarization analyser capable of preventing the propagation of a polarized optical signal p and allowing a polarized signal s to pass. In this way, when the device is in the crossed state, the optical signal 100 leaves the fibre 230 (switch open), whereas, when the device is in the barred state, the polarized optical signals p and s are inhibited by the two polarization analysers and the switch will be closed.

It is also worth noting that said single crystal 200 is characterized by two response times:

- a time $t_{on}$ relating to the process of photogeneration of the carriers and the creation of the counter-field (screening effect) and
- a time $t_{off}$ relating, on the other hand, to the process of recombination of these charges and restoration of the initial conditions.

Experiments conducted by the inventors have shown that, for a single crystal of CdTe:In, the time $t_{on}$ is very fast and follows the rising time of the optical control beam. For example, when the optical control beam consists of a train of optical pulses with a sufficiently high power density (greater than about $10^5$ W/cm$^2$), $t_{on}$ may also be of the order of a few ns. The time $t_{off}$, on the other hand, is very much slower (typically a few $\mu$s) and is strictly related to the spatial distribution of said optical control pulse. For this reason, with said single crystal 200 consisting of CdTe:In it is not possible to provide a device with a response time of less than about a few microseconds.

In the case where a device with a response time of the order of a few nanoseconds is required, it is possible to use the embodiment shown in FIGS. 7(a) and 7(b).

Figure 7:
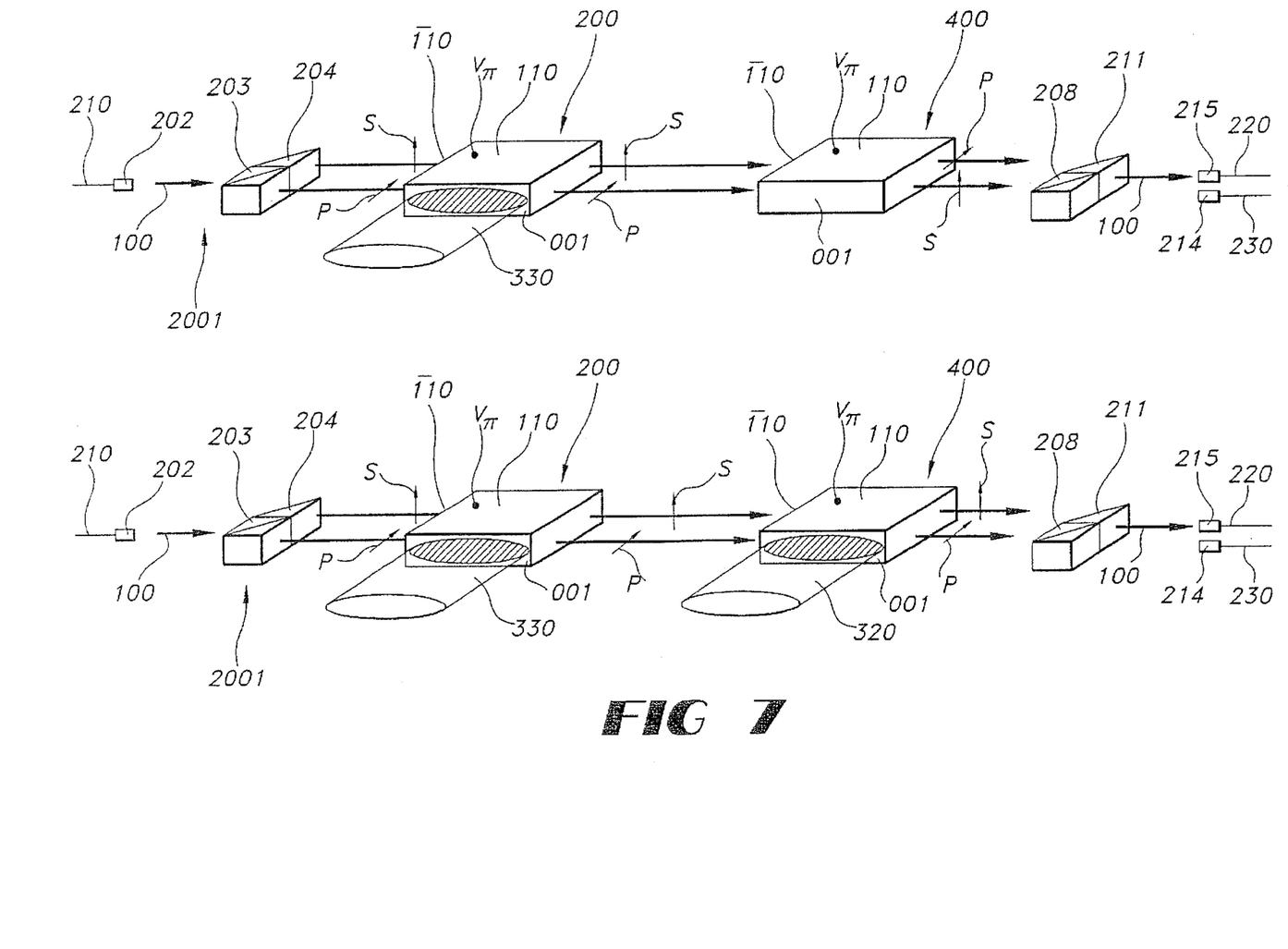
FIG. 7 shows a schematic illustration of a variation of the embodiment of the optical switching device according to FIG. 1.

In the case where a device with a response time of the order of a few nanoseconds is required, it is possible to use the embodiment shown in FIG. 7.

This embodiment has the same structural and functional characteristics as that of FIG. 1, except for the fact that it also comprises a second single crystal 400, an optical source (not shown) for a second optical control beam 320 and two further dichroic mirrors 206', 207' for directing, in a manner similar to that already described in connection with FIG. 1, said second optical control beam 320 onto the face 110 of said single crystal 400. For the sake of simplicity of the description, in FIGS. 7(a) and 7(b) the dichroic mirrors 206, 207, 206' and 207' are not shown and the optical control beams 330 and 320 are applied to the respective single crystals 200 and 400 in a direction perpendicular to the face 001 instead of to the face 110, as shown in FIG. 1.

As shown in FIGS. 7(a) and 7(b), the first single crystal 200 and the second single crystal 400 are arranged in series and are controlled by means of the respective optical control beams 330 and 320.

Initially, in the absence of the optical control beams 330 and 320, the state of polarization of said polarized optical signals p and s is rotated through 90°, as a result of the electro-optical effect, both in said single crystal 200 and in said single crystal 400 such that, when leaving the single crystal 400, the two polarized optical signals p and s have the same state of polarization which they had when entering said single crystal 200 and the device is in its barred state (optical signal 100 in the fibre 220).

As shown in FIG. 7(a), when an optical control pulse 330 reached said first single crystal 200, the screening effect created by the photo-generated charge carriers inhibits the electro-optical effect in the illuminated region of said single crystal 200. The state of polarization of said polarized optical signals p and s is thus rotated through 90° owing to the electro-optical effect only when passing along said single crystal 400. In this way the device passes from the barred state to the crossed state (optical signal 100 in the fibre 230) with a response time of $t_{on}$.

At this point the device 1000 would remain in this condition, and hence in the crossed state, for the whole of the switched-off time $t_{off}$ of said single crystal 200.

Instead, by sending an optical control pulse 320 to said single crystal 400 after a predetermined time interval $t_w$ less than $t_{off}$, the device 1000 returns again into the barred state with a response time of less than $t_{off}$.

In fact, when said optical control pulse 320 is present in the single as shown in FIG. 7(b), the state of polarization of said polarized optical signals p and s is no longer rotated (screening effect) and therefore, after a time $t_w$ from arrival of the first optical control pulse 330, the device 1000 returns to the barred state with a response time equal to about $t_{on}$.

This duration $t_w$ must not be greater than the typical switched-off times $t_{off}$ of said single crystals 200 and 400. Moreover it must not be less than $t_{on}$ so as to allow said single crystal 200 to respond to said optical control pulse 330.

The temporal duration of a cycle involving switching between the barred/crossed/barred states may therefore be very fast (of the order of nanoseconds) and may be chosen by suitably selecting the delay $t_w$ between the optical control pulses 330 and 320 and the time $t_{on}$.

Figure 2:
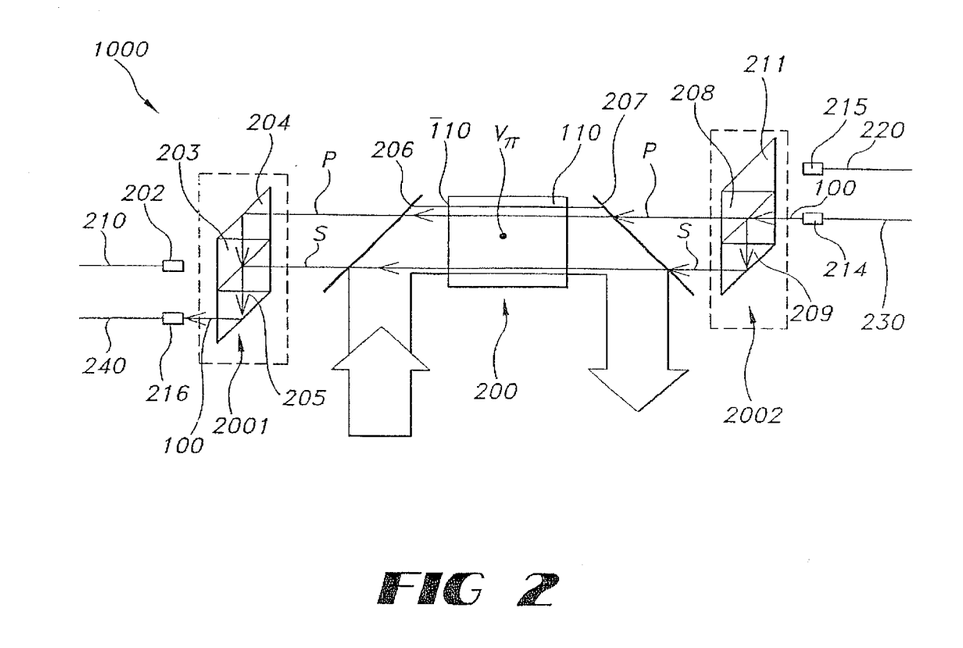
FIG. 2 shows a schematic illustration of a second embodiment of an optical device according to the invention which has two inputs and two outputs (2×2), an optical signal entering the fibre 230 and is in its barred state.

The second embodiment of the device 1000 according to the invention, shown in FIG. 2, has the same structural and functional characteristics as that of FIG. 1, except for the fact that it also comprises a second input fibre 240, a fourth collimator 216 optically connected thereto and a second input reflecting prism 205 associated with said polarization separator 203.

Consequently, this embodiment is suitable for use as a 2×2 bi-directional directing device.

As regards the structural and functional characteristics of the input fibre 240, the fourth collimator 216 and the second input reflecting prism 205, reference is made to that already described above in connection with the first embodiment according to FIG. 1.

Figure 3A:
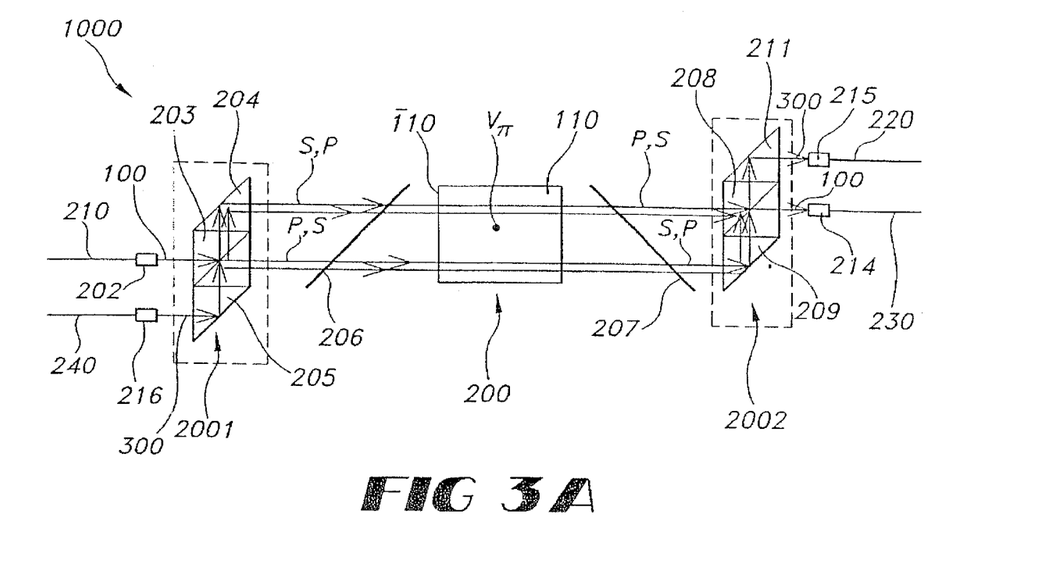
Figure 3B:
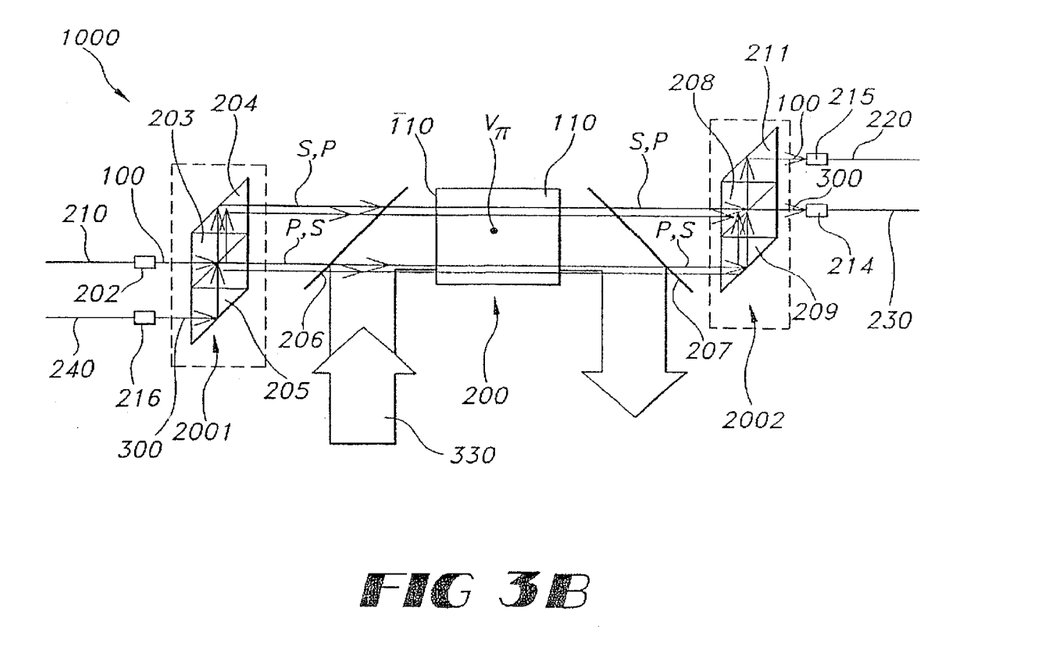

FIGS. 3A and 3B illustrate operation of the second embodiment according to FIG. 2 in the case of two input optical signals 100 and 300 having a random state of polarization and coming from the input fibres 210 and 240, respectively.

In a manner similar to the first embodiment according to FIG. 1, each of the two input optical signals 100 and 300 is separated spatially into two associated optical signals polarized in the polarization states p and s by means of the polarization divider and the reflecting prisms 204 and 205. In this way, two parallel optical paths lying in the same plane parallel to the face A of the single crystal 200 are formed in the single crystal 200: along a first optical path the polarized optical signal s derived from the optical signal 100 and the second polarized optical signal p derived from the optical signal 300 are propagated; along a second optical path the polarized optical signal p derived from the optical signal 100 and the polarized optical signal s derived from the optical signal 300 are propagated.

In the absence of the optical control beam 330, the state of polarization of the polarized optical signals p and s is rotated through 90° on account of the electro-optical effect induced in the single crystal 200 and the optical signal 100 coming from the fibre 210 is thus directed onto the output fibre 230, while the optical signal 300 coming from the fibre 240 is directed onto the output fibre 220 (crossed state, FIG. 3A).

In turn, in the presence of the optical control beam 330, the electro-optical effect induced in the single crystal 200 is cancelled out such that the optical signal 100 coming from the fibre 210 is directed onto the output fibre 220 and the optical signal 300 coming from the input fibre 240 is directed onto the output fibre 230 (barred state, FIG. 3B).

A first advantage of the optical device of the invention according to this second embodiment consists in the fact that the polarized optical signals p and s which are propagated along the same optical path in said single crystal 200 do not interfere with each other since they are polarized in states of polarization which are mutually perpendicular.

Moreover, the directing operation occurs simultaneously for the two optical signals 100, 300 and is performed in only one single crystal with a single optical control beam.

Finally, the device according to this embodiment is bidirectional and processes in the same manner the optical signals which are propagated, in FIGS. 2 and 3, from left to right and, vice versa, from right to left.

Figure 4:
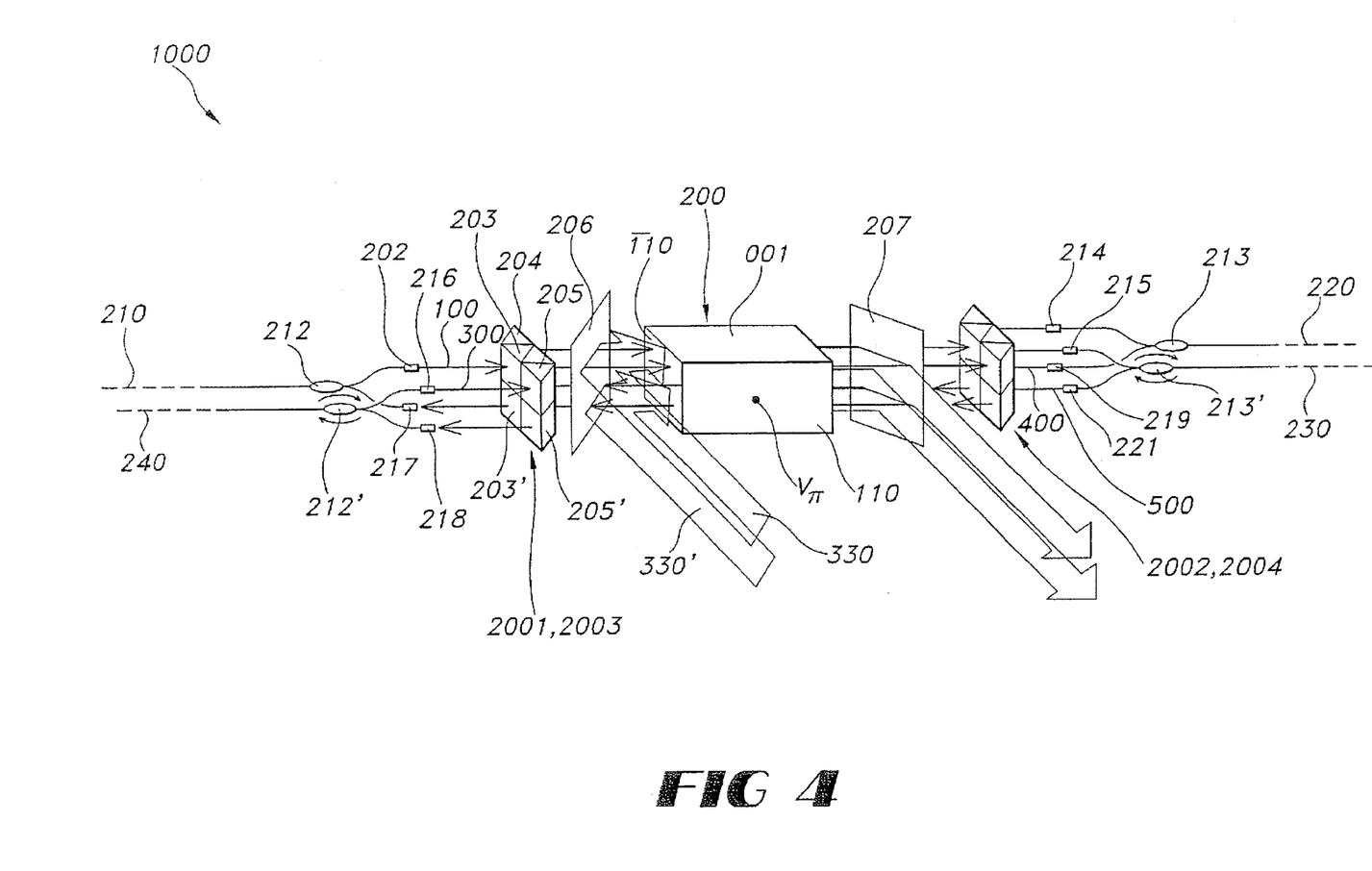
FIG. 4 shows a schematic illustration of a third embodiment of a 2×2 optical device according to the invention in its barred state in which two pairs of optical paths are stacked on top of one another in two planes parallel to the face 110 of the single crystal and two optical control beams are superimposed on and collinear with the respective pair of optical paths.

FIG. 4 shows schematically a third embodiment of the device 1000 according to the invention.

This embodiment has the same structural and functional characteristics as the second embodiment according to FIG. 3, except for the fact that it also comprises a fifth collimator 217, a sixth collimator 218, a seventh collimator 219 and an eighth collimator 221, a third and fourth optical element 2003, 2004 and a first, second, third and fourth optical circulator, 212, 212', 213 and 213', respectively.

In turn, each of the optical elements 2003 and 2004 comprises a polarization separator 203' and 208', respectively, and two right-angled reflecting prisms 204' (not shown), 205', and 211' (not shown), 209', respectively.

As regards the structural and functional characteristics of the polarization separators 203', 208', the right-angled reflecting prisms 204', 205', 211', 209' and the collimators 217, 218, 219, 221, reference is made to that already described above in connection with the preceding embodiments of the device 1000 according to the invention.

The optical circulators 212, 212', 213, 213' are conventional devices such as, for example, those manufactured by E-TEK DYNAMICS INC. with insertion losses of about 1 dB.

Alternatively, instead of the optical circulators, it is possible to use, in a manner obvious to an average person skilled in the art, conventional (for example 3 dB) directional couplers.

The optical circulator 212 has a first port connected to the fibre 210, a second port connected to the collimator 202 and a third port connected to the collimator 217. Moreover, the optical circulator 212' has a first port connected to the fibre 240, a second port connected to the collimator 216 and a third port connected to the collimator 218.

In turn, the collimator 202 is optically connected to the polarization separator 203, the collimator 217 is optically connected to the polarization separator 203', the collimator 216 is optically connected to the reflecting prism 205 and the collimator 218 is optically connected to the reflecting prism 205'.

Moreover, the optical circulator 213 has a first port connected to the fibre 220, a second port connected to the collimator 214 and a third port connected to the collimator 219. The optical circulator 213' has a first port connected to the fibre 230, a second port connected to the collimator 215 and a third port connected to the collimator 221.

In turn, the collimator 214 is optically connected to the reflecting prism 211, the collimator 219 is optically connected to the reflecting prism 211', the collimator 215 is optically connected to the polarization separator 208 and the collimator 221 is optically connected to the polarization separator 208'.

Consequently, as shown in FIG. 4, as a result of the optical circulators 212, 212', 213, 213' and the collimators 202, 216, 217, 218, 214, 215, 219, 221, it is possible to separate spatially, in the single crystal 200, two optical signals 100 and 300 which are propagated in one direction (in FIG. 4 from left to right) from two optical signals 400 and 500 which are propagated in the opposite direction (in FIG. 4 from right to left). More particularly, in the embodiment according to FIG. 4, the two optical signals 100 and 300 coming from the optical fibres 210 and 240, respectively, pass through the single crystal 200 from left to right, in an upper region thereof, while the two optical signals 400 and 500 coming from the optical fibres 220 and 230, respectively, pass through it from right to left in a lower region thereof.

In the single crystal 200, therefore, two pairs of optical paths lying in two planes parallel to one another and to the face 001 of the single crystal 200 are distinguished. Along one of the two pairs of optical paths, in said upper region of said single crystal 200, polarized optical signals p and s derived from the optical signals 100, 300 are propagated, while along the other of the two pairs of optical paths, in said lower region, polarized optical signals p and s derived from the optical signals 400, 500 are propagated.

The two operating states of the device ("crossed" and "barred") are controlled by two optical control beams 330 and 330'. Said beams are independent of one another, act spatially separated and are reflected by the dichroic mirrors 206 and 207 so that the optical control beam 330 irradiates said upper region and the optical control beam 330' irradiates said lower region of the single crystal 200. Moreover, said optical control beams 330 and 330' are preferably collimated by suitable collimators (for example a cylindrical lens not shown in FIG. 4) so that they strike said dichroic mirror 206 at 45°.

The optical control beam 330, being thus superimposed on the optical signals 100 and 300, varies their state of polarization and causes routing thereof into the fibres 220, 230. The optical control beam 330' on the other hand, being superimposed on the optical signals 400 and 500, varies the state of polarization of these signals and causes routing thereof into the fibres 210, 240.

So that the screening effect caused by an optical control beam does not influence the propagation also of the optical signals which are propagated under the influence of the screening effect caused by another optical control beam, the voltage Vπ is preferably applied in a direction perpendicular to the direction in which the two optical control beams 330, 330' are stacked or arranged alongside each other.

For example, in FIG. 4, so that the screening effect caused by the optical control beam 330 does not influence also the propagation of the optical signals 400 and 500 which are propagated in the lower region of the single crystal 200 and, vice versa, so that the screening effect caused by the optical control beam 330' does not influence also the propagation of the optical signals 100 and 300 which are propagated in the upper region of the single crystal 200, the voltage Vπ is preferably applied perpendicularly with respect to the direction in which the two optical control beams 330, 330' are stacked (perpendicularly with respect to the face 110 of the single crystal 200).

Figure 8:
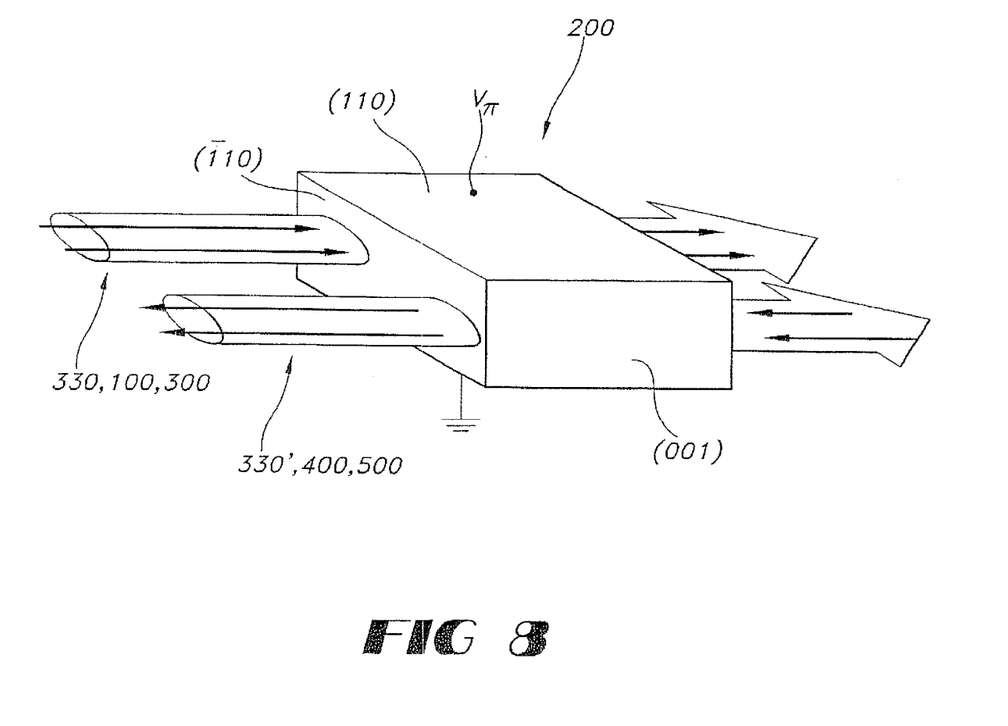
FIG. 8 shows a variation of the optical switching device according to FIG. 4, in which two pairs of optical paths are arranged alongside one another in the same plane parallel to the face 110 of the single crystal and two optical control beams are superimposed on and collinear with the respective pair of optical paths.

In turn, in a variation of embodiment of the device according to FIG. 4, in which the abovementioned two pairs of optical paths are arranged alongside one another in the same plane parallel to the face 110 of the single crystal 200 and the two optical control beams 330, 330' are superimposed on and collinear with the respective pair of optical paths, the voltage Vπ is preferably applied at right angles to the face 110 of the single crystal 200, or at right angles to the direction in which the two optical control beams 330, 330' are arranged alongside each other (FIG. 8).

The results of experiments show moreover that, when several polarized optical signals and the associated optical control beams are propagated in only one single crystal, the screening effect created by a first optical control beam does not influence the propagation of the polarized optical signals surrounding the region illuminated by it, when said optical control beams are separated by a predetermined distance.

Figure 6:
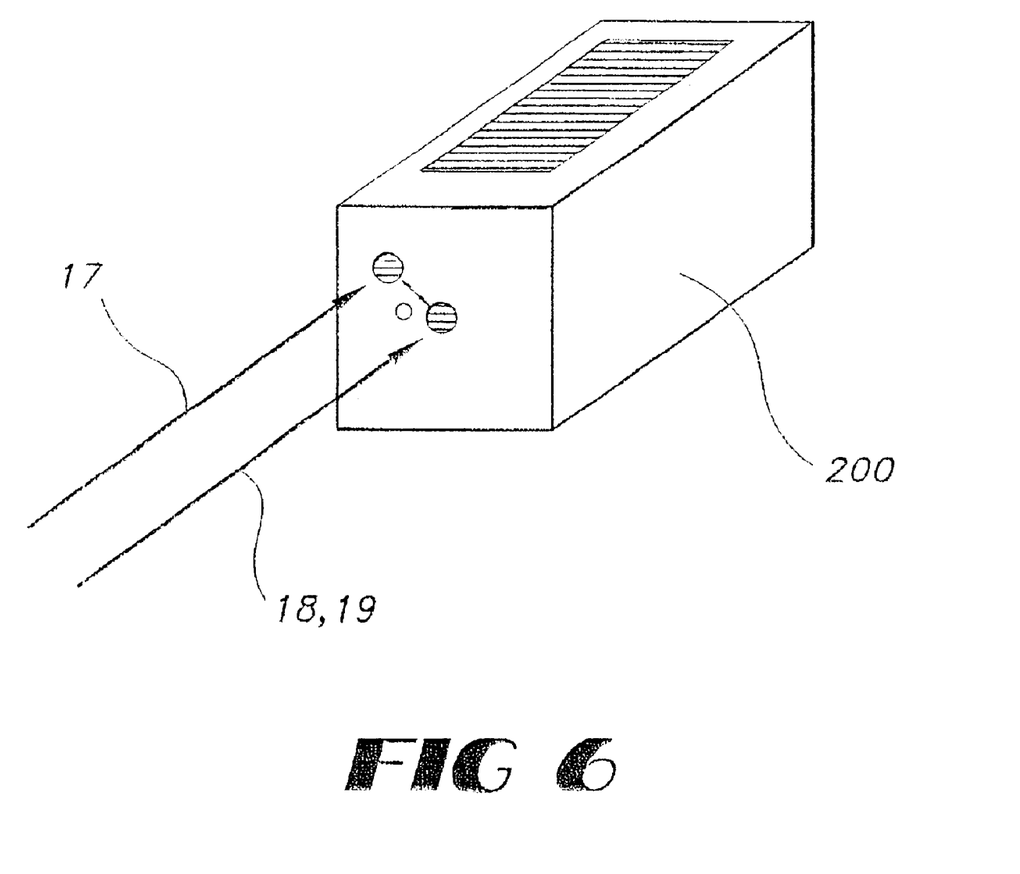
FIG. 6 illustrates the experiment by means of which it was possible to determine the minimum distance required such that an optical control beam does not influence a polarized optical signal inside a crystal element devoid of internal separation planes.

For example, FIG. 6 shows an experiment which was carried out by the inventors and in which two polarized optical signals 17 and 18 with a wavelength of about 1550 nm were propagated substantially parallel in a single crystal 200; 400. A continuous optical control beam 19 with a wavelength of about 1064 nm was combined in a fibre with the polarized optical signal 18 so that, at the output from said fibre, they would be propagated in free space along said sole single crystal 200 properly superimposed and collinear.

The polarized optical signal 18 and the associated optical control beam 19 were then kept immobile in the centre of the single crystal 200, while the position of the polarized optical signal 17 was varied inside said single crystal 200 using a mechanical micro-positioning device.

The results of the experiments have thus shown that, at a distance D of about 0.5 mm from the optical control beam 19, the polarized optical signal 17 was no longer substantially influenced by the screening effect created by said optical control beam 19, unless the latter had a power greater than that strictly necessary for controlling the polarized optical signal 18 (about 150 μW CW corresponding to about 0.5 mW/mm² for a diameter of the optical control beam of about 600 μm).

These results show, therefore, that in a sole single crystal it is possible to control, independently of one another, two or more polarized optical signals (and therefore also two or more groups of polarized optical signals) by means of the use of two or more optical control beams superimposed on the respective polarized optical signals, when the optical control beams are separated from one another by a predetermined distance D.

This third embodiment of the optical device according to the invention, shown in FIG. 4, is therefore suitable for routing optical signals coming from the optical fibres 210, 240 into the fibres 220, 230 and, independently therefrom, optical signals coming from the optical fibres 220, 230, into the fibres 210, 240.

For example, said embodiment is capable of operating in the barred state for the two signals which are propagated from left to right, effecting a connection 210–220 and 240–230, and at the same time of operating in the crossed state for the two signals which are propagated from right to left, effecting the connection 220–240 and 230–210.

With reference to the operation of the upper and lower region of this embodiment of the device 1000, it is entirely similar to that described above in relation to the preceding embodiments of the device 1000. Therefore, in connection therewith, reference should be made to that already stated.

Finally, it is also worth noting that the device according to the invention in this embodiment is more compact and simpler to manufacture than a corresponding electrically controlled electro-optical device. In fact, the device according to the invention is able to process several optical signals and control them in a manner independently of one another using a sole single crystal, while a similar electrically controlled optical device requires as many crystals, each with its own applied voltage, as there are optical signals to be processed.

The optical device according to the invention in its various embodiments described may, for example, be used in the nodes of an optical switching network in which it is required to process an optical signal in optical form and, for example, perform sampling of one or more optical signals or N×N directing of N optical signals from N inputs to N outputs.

In order to verify the behaviour of the device according to the invention, the inventors of the present invention have conducted experimental measurements.

A first experimental test was performed in order to determine the cross-talk of the device according to the invention, namely the ratio between the optical power present at the output not corresponding to the operating mode (crossed or barred) used for the device and the optical power at the input thereto.

For this experimental test, a device such as that described in FIG. 1 with an optical signal 100 entering the optical fibre 210 was used.

The crystal element was a single crystal of CdTe:In manufactured by the company II–VI Inc., with dimensions of 5×5×15 mm, to which a voltage $V\pi$ of about 2000 V was applied.

The device controlling the voltage $V\pi$ was manufactured by FLUKE, with a degree of precision of about 1 V.

The right-angled reflecting prisms 204, 205, 209, 211 had dimensions of 2×2 mm and were manufactured by NITTO.

The polarization separators 203, 208 were manufactured by NITTO, had dimensions of 2×2 mm and had a polarization insensitivity of about −30 dB.

The dichroic mirrors 206, 207 were manufactured by NITTO.

The collimators 202, 216, 214, 215 were "grin" lenses manufactured by SELFOC.

The optical signal 100 was supplied by a FUJITSU laser source (laser diode of the DFB type) with an emission of 1550 nm and an output power of 10 mW. The optical control beam, on the other hand, was supplied by an Nd:YAG laser source with an emission of 1064 nm and output power of about 100 mW.

An optical power measuring device was positioned in the region of the output optical fibres 220, 230.

In this way, while keeping fixed the state of polarization of the input optical signal 100, the optical power at the two outputs of the device was measured both when it was in its crossed state (voltage $V\pi$ applied to the electrodes of the single crystal 200) and in its barred state (application also of the optical control beam).

The cross-talk values thus obtained were minimum results.

In fact, for the crossed state, the optical power measured at the output optical fibre 230 ($P_{230}$) was lower, by a minimum amount ($2/1000$ or −27 dB), than the optical power at the input to the device ($P_{210}$). In other words, only about $2/1000$ of the power of the input optical signal 100 left the device 1000 via the output not corresponding to the operating mode used, namely via the fibre 220 (or $P_{220}/P_{210} = 2/1000$)

In turn, in the case of the barred state also, the optical power measured at the output from the device 1000 was lower, by a minimum amount ($5/1000$ or −23 dB), than the optical power at the input to the device ($P_{230}/P_{210} = 5/1000$).

In the crossed operating state of the device according to the invention, the cross-talk was therefore about −27 dB, while in the barred operating state it was about −23 dB.

A second experimental test was then carried out in order to determine the sensitivity of the device according to the invention to the state of polarization of the input optical signal, or in order to determine the variation of the power output from the device when the state of polarization of the input optical signal was varied.

The same measurement conditions as in the preceding experimental test were therefore used, except for the fact that the optical control beam was not present and, at the output of the optical fibre 210, a lamina $\lambda/4$ and a lamina $\lambda/2$ were positioned in order to vary the state of polarization of the optical signal 100 coming from said optical fibre 210. By moving said laminae it was thus possible to obtain all the possible states of polarization.

These laminae were manufactured by BERNHARD HALLE.

Moreover, this measurement was performed, initially, without the single crystal 200, and subsequently in the presence of said single crystal 200 with the voltage $V\pi$ applied to its electrodes (crossed state of the device).

When the optical power output from the device via the two optical fibres 220, 230 was measured, minimum variations in the output power were thus recorded when the state of polarization of the input optical signal 100 was varied. In fact, the maximum variation in the output power was equal to about $1/1000$ (−30 dB) of the input power.

Since, both in the absence and in the presence of said single crystal 200, the same variations in the optical power output from the device were recorded, they cannot be attributed to said single crystal, but to other elements of the device according to the invention.

What is claimed is:

1. Optical device comprising:
   a) a first input for at least one input optical signal having a random state of polarization;
   b) a first optical element operable for dividing, in space, said at least one input optical signal into a pair of optical signals which are substantially parallel and have a predetermined state of polarization perpendicular to one another;
   c) a first crystal element for propagation, in free space, of at least said pair of optical signals coming from said first optical element, said first crystal element being devoid of internal separation planes, having electro-optical properties and being associated with electrodes so as to apply a voltage in a direction substantially perpendicular to the direction of propagation, along said first crystal element, of said at least one pair of optical signals;
   d) an optical control element for supplying at least one optical control beam, having a predetermined power, to said first crystal element, said at least one optical control beam being superimposed on said at least one pair of optical signals and having a direction of propagation which along said first crystal element is substantially perpendicular to said direction of application of said voltage, said at least one optical control beam being capable of causing to rotate through a predetermined angle the state of polarization of said at least one pair of optical signals in said first crystal element;

e) a second optical element operable for combining said at least one pair of optical signals coming from said first crystal element in a single output optical signal; and f) a first output for said output optical signal.

2. Optical device according to claim 1, wherein said optical control beam is also substantially collinear with said at least one pair of optical signals.

3. Optical device according to claim 1, further comprising a second output.

4. Optical device according to claim 1, further comprising a second input for at least one second optical signal having a random state of polarization.

5. Optical device according to claim 1, wherein said first crystal element consists of a single crystal of cadmium telluride doped with indium (CdTe:In).

6. Optical device according to claim 1, wherein said voltage applied to the electrodes of said first crystal element is selected so as to rotate through an angle of about 90° the state of polarization of said at least one pair of optical signals.

7. Optical device according to claim 6, wherein the power of said optical control beam is selected so as to cancel out the effect of said voltage, causing said at least one pair of optical signals to return to their initial state of polarization.

8. Optical device according to claim 1, further comprising a second crystal element positioned between said first crystal element and said second optical element and in that said optical control element also supplies a second optical control beam for said second crystal element.

9. Optical device according to any one of claims 4 to 8, comprising:

first optical elements operable for dividing two first optical signals, which have a random state of polarization, into two respective first pairs of substantially parallel optical signals, which have a predetermined state of polarization perpendicular to one another, and of causing propagation of said first pairs of optical signals in a first region of said first crystal element, and second optical elements operable for dividing two second optical signals, which have a random state of polarization, into two respective second pairs of substantially parallel optical signals which have a predetermined state of polarization perpendicular to one another, and of causing propagation of said second pairs of optical signals in a second region of said first crystal element.

10. Optical device according to claim 9, wherein said optical control element also supplies a second optical control beam which illuminates said second region of said first crystal element, while said first optical control beam illuminates said first region of said first crystal element and said second region is different from said first region.

* * * * *